United States Patent [19]

Brennan

[11] Patent Number: 4,511,178
[45] Date of Patent: Apr. 16, 1985

[54] QUICK RELEASE MOUNTING FOR SEAT BACK TRAY TABLE

[75] Inventor: Edward J. Brennan, Litchfield, Conn.

[73] Assignee: PTC Aerospace Inc., Bantam, Conn.

[21] Appl. No.: 450,400

[22] Filed: Dec. 16, 1982

[51] Int. Cl.³ .............................................. A47B 83/02
[52] U.S. Cl. .................................... 297/146; 297/163; 297/440; 297/167
[58] Field of Search ...................... 297/163–169, 297/146, 191, 440; 108/38

[56] References Cited

U.S. PATENT DOCUMENTS

| | | | |
|---|---|---|---|
| 2,619,395 | 11/1952 | Kent | 297/146 |
| 2,831,740 | 4/1958 | Schieber | 108/38 |
| 3,009,737 | 11/1961 | Burnett | 297/146 |
| 3,795,422 | 3/1974 | Robinson et al. | 297/146 |
| 4,159,071 | 6/1979 | Roca | 297/163 |
| 4,364,604 | 12/1982 | Brunelle | 297/163 |
| 4,431,231 | 2/1984 | Elazari et al. | 297/167 |

FOREIGN PATENT DOCUMENTS 1209207 9/1959 France ............................. 297/146

Primary Examiner—Francis K. Zugel
Attorney, Agent, or Firm—James R. Hoatson, Jr.; Barry L. Clark; William H. Page, II

[57] ABSTRACT

Improved constructions for mounting seat back tray tables to the frames of vehicle seats permit the tables to be quickly removed and replaced by authorized persons without the use of tools. Small studs on each side of the seat pivotally support apertures in the lower ends of the tray table legs. The legs may be deflected toward each other to release their mounting engagement with the studs but means are provided to prevent such release by unauthorized persons. In one embodiment, release can only be accomplished when the seat back is in its forward "break-over" position. In such position, the legs can be lifted so that a frame-mounted stud having a cylindrical end interrupted by a pair of opposed flats will pass from a small opening in the leg through a slot narrower than the small opening to a larger opening. In a second embodiment, a torsion tube joining the leg ends has a spring-loaded pin and slot connection to one leg so that the leg can be slightly axially retracted along the tube to accomplish release. The dress cover of the seat back includes a rear portion which overlies and conceals the torsion tube.

13 Claims, 9 Drawing Figures

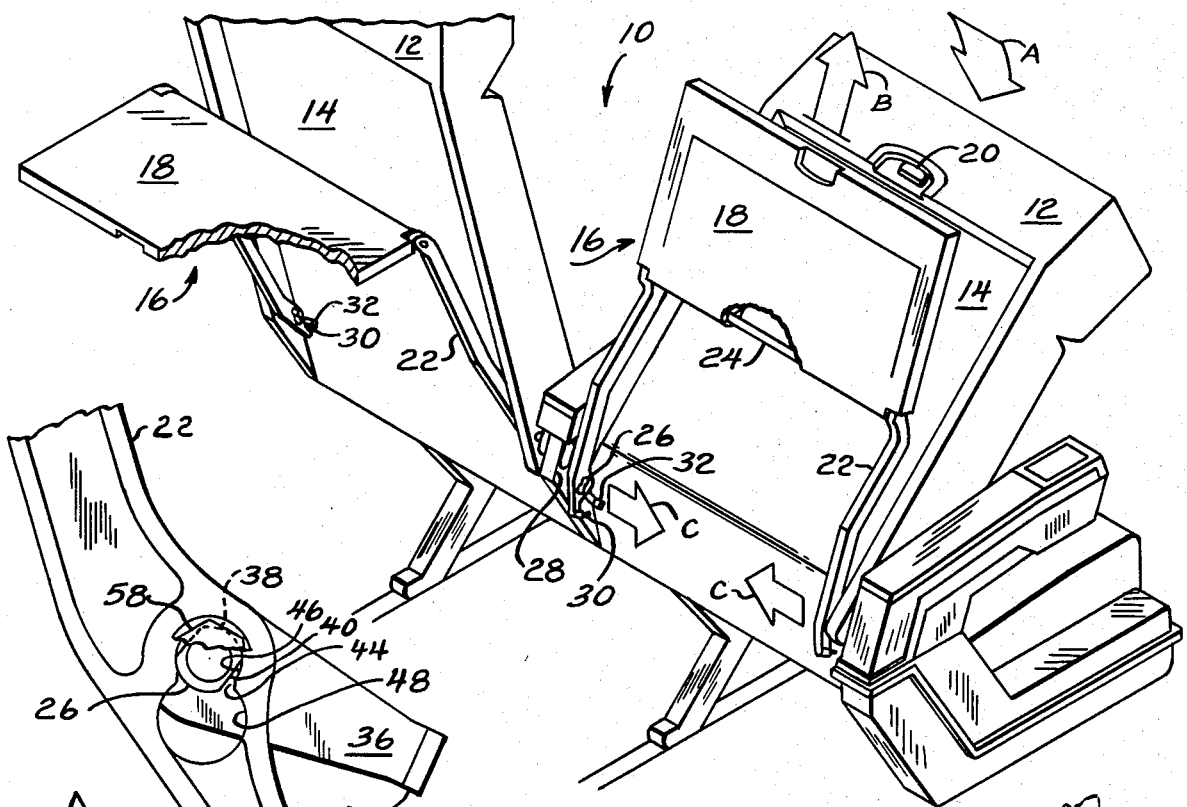

4,511,178

QUICK RELEASE MOUNTING FOR SEAT BACK TRAY TABLE

BACKGROUND OF THE INVENTION

The invention relates to vehicle seats, and particularly aircraft seats, of the type having tray tables mounted on legs in their backs. The tray tables are pivotally movable between a latched, generally vertical storage position within the seat back and a deployed, generally horizontal use position. Since the seat backs of such seats are typically reclinable, the tray table legs are usually pivotally mounted to the seat frame. Such mounting permits a deployed tray table to remain horizontally fixed in space regardless of the reclining movement of the seat back. In the usual seat construction, a retaining bolt goes through the table leg, the seat back frame and the seat fore and aft support frame member.

Tray tables are subject to substantial wear and abuse and require frequent replacement. Unfortunately, the conventional mounting constructions require the expenditure of considerable time, the use of a number of special tools, and the disassembly of many parts to replace a tray table. This situation greatly increases maintenance costs.

It would appear to be very advantageous to provide a tray table mounting construction that permits the table to be quickly released from the seat to facilitate maintenance. However, it would be highly desirable that such table not be releasable by unauthorized persons, such as passengers.

SUMMARY OF THE INVENTION

It is among the objects of the present invention to provide a quickly releasable mounting construction for attaching a tray table assembly to a pair of seat frame members. It is a further object to provide such a construction which can be easily operated by an authorized person but not by an unauthorized person. These and other objects are attained by the tray table assembly and mounting construction of the present invention. The tray table assembly includes a tray portion which is pivotally attached to the upper end of a pair of table legs whose lower ends are pivotally mounted to frame members of the seat. Stop portions on the frame members limit the angular extent of movement of the table legs in their fully deployed position while stop portions on the table legs and/or tray are typically provided to permit the angular position of the deployed tray to be slightly adjusted to achieve a horizontal position. A torsion tube joins the spaced legs to increase the rigidity of the tray assembly. In a first disclosed embodiment of the invention, the torsion tube is enclosed within the tray while in a second disclosed embodiment, the torsion tube extends between the lower ends of the table legs. In each embodiment, a stud-like pivot member projects from a seat frame member on one side of the seat back and is in alignment with a similar member on the other side. An aperture in each table leg is pivotally mounted on the stud-like pivot member.

In the first disclosed embodiment, the lower ends of the table legs include a relatively small diameter upper opening joined by a parallel-sided restricted width slot of a smaller dimension to a relatively large diameter lower opening. Fixed against rotation to each frame member is a pivot stud having a cylindrical outer end portion. Said pivot end portions are interrupted by a pair of opposed parallel flats. The diameter of the cylindrical outer end portion of the stud is the same as the small diameter upper opening in the table leg so that the legs can be pivoted about the axis of the stud to move the tray assembly between its storage and use positions. The headed portions of the bolts which hold the pivot studs to the frame members are larger than the cylindrical outer end portions and prevent the legs from being pulled towards each other when the pivot studs are in the small upper openings. In all normal positions of the seat back between its forward upright position and its fully reclined position, the parallel flats on the pivot studs are at an angle to the parallel sides of the restricted width slot in the table legs. Thus, in all normal positions of the seat back, it is impossible for the table legs to be lifted so that the studs move through the restricted slots and into the large openings where the legs can be disassembled from the studs by being deflected toward each other sufficiently to pass over the heads of the bolts which retain the studs. The latter movement can only take place when the seat back is in its "break-over" position overlying the seat cushion. This position is achieved by applying a forward load of 35 pounds or so to the top of the seat back and the usual passenger is unaware of the fact that the seat back can move forward in this fashion. Thus, the tray table is safe from being removed by unauthorized persons, but can easily be removed by authorized persons in a few seconds. Removal is accomplished by simply moving the seat back forward of its normal upright position by applying pressure to the seat back and then pivoting the unlatched tray table to the generally vertical position in which the sides of the restricted width slots in the legs are aligned with the parallel flats on the pivot studs. The table legs can then be lifted to align the large openings therein with the heads of the stud retaining bolts and deflected toward each other to clear the bolt heads.

The second disclosed "quick release" construction embodiment is for a tray table whose torsion bar is at the lower ends of its legs. It can be used on a seat back that cannot be moved to a forward "break-over" position, but is slightly easier to operate when the seat back is forward. As noted, the torsion tube which lends rigidity to the table assembly is positioned between the lower ends of the spaced table legs. It is preferably nonrotatably fixed to a first leg, such as by a pin, and keyed to the second leg so that the second leg can be slidably deflected axially of the tube but cannot rotate relative to it. If desired, however, the first leg could be mounted to deflect similarly to the second leg. Pivot bosses or studs on the seat frame members which support the two spaced table legs are axially aligned with each other and are adapted to fit within axially aligned apertures or openings formed in the two legs. A compression spring is preferably positioned inside the torsion tube so that the second leg is normally biased away from the first leg so as to maintain the legs in engagement with the pivot bosses. When the tray table assembly is to be removed from the seat back, the flap of the seat back dress cover which normally conceals the torsion tube from the seat occupant's view is detached from the seat and the second leg is then deflected toward the first leg to free the leg from its retaining boss. A transverse pin in the leg and an axial slot in the wall of the torsion tube cooperate to permit the deflection of the leg along the tube axis without allowing rotation. Since the usual seat occupant is not aware of either the fact that the dress cover conceals a torsion tube or the procedure for removing the dress cover and releasing the connection between the tube and table leg, it is obvious that the quick release connection feature is quite esoteric and operable only by authorized persons.

BRIEF DESCRIPTION OF THE DRAWINGS

FIG. 1 is a partially broken-away perspective view of a multi-passenger aircraft seat with the left seat shown in its normal upright position with its tray table deployed, and the right seat back in its "break-over" position with its tray table rotated to the particular forward angle at which it can be quickly released from its mountings;

FIG. 2 is a fragmentary side view showing the relationship of the lower end of one of the tray table legs of the FIG. 1 embodiment relative to its pivot axis and a stop bracket when the tray table is stored and the seat back is in its normal upright position;

FIG. 3 is a side view similar to FIG. 2 but showing the tray table leg when the tray table is in its fully deployed use position;

FIG. 4 is a side view similar to FIG. 2 but showing the tray table leg rotated forward of its normal forward upright position and lifted relative to its pivot axis so that it can be deflected sideways and released from its mountings;

FIG. 5 is a rear view showing the table leg and associated elements in their FIG. 4 position in solid lines;

FIG. 6 is a fragmentary, exploded, perspective view showing the table leg mounting elements of FIGS. 1–5 and their relationship to a portion of the frame;

DETAILED DESCRIPTION OF THE DRAWINGS

Figure 7:
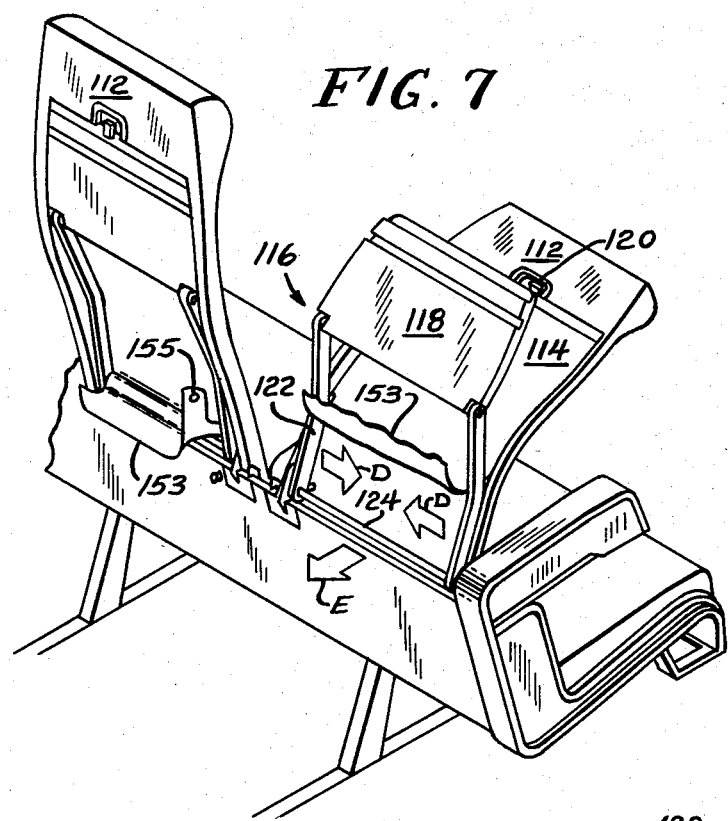
FIG. 7 shows a partially broken-away perspective view of a modified form of and tray table mounting assembly.

Referring to the drawings, FIG. 1 shows a multi-passenger seating unit indicated generally at 10 which illustrates the overall relationship between the quickly releasable tray table mounting mechanism of the invention and a seat on which it is mounted. The seating unit 10 includes a plurality of seat backs 12 having recesses 14 in their rear surfaces into which tray table assemblies indicated generally at 16 are adapted to be stored when not in use. The tray table assembly 16 includes a tray table portion 18 which is retained in the seat back recess 14 in a storage mode by means of a fastener 20. The tray table 18 is pivotally supported on a pair of table legs 22 between which a torsion tube 24 is mounted. The torsion tube insures that the relatively light weight table assembly 16 will not be damaged should an extraordinarily heavy load be applied to one side of it. The table legs 22 are pivotally mounted on pivot studs 26 which are non-rotatably affixed to fixed frame members 28. The use position of the tray table 18 is shown in the left-hand portion of FIG. 1 and is determined by the position of the table when contact is made between cooperating stop members 30, 32, on the table legs 22 and frame 28, respectively.

The quick release mechanism can be seen much more clearly in FIGS. 2 through 6. In these figures, the frame stop member 32 can be seen to be a flange portion which is bent at right angles to the body of a bracket member 36 which is welded to the pivot stud 26. The pivot stud 26 includes a cylindrical bearing portion 38 and a pair of parallel flat portions 40 cut into said cylindrical portion. The fixed pivot stud 26 is adapted to move relative to an elongated slot 44 which is formed in the lower end of the leg members 22. The slot 44 has a small diameter upper end bearing portion 46 which is joined to a large diameter lower end portion 48 by a pair of parallel flat connection portions 50 which provide a restriction between the large and small ends of the slot. The distance between the parallel flat portions 50 is just sufficient to accommodate the dimension of the stud member 26 between its flatted portions 40 when all the parallel portions are in line with each other as hereinafter described. At the lower end of the leg member 22, a threaded bolt member 52 is mounted for adjusting the angle of the table legs when the tray table assembly 16 is in its use position shown at the left side of FIG. 1. The head of the bolt 52 comprises the aforementioned stop member 30 which engages the aforementioned stop member 32. The pivot stud 26 which supports the tray table legs 22 is anchored to the frame member 28 of the seat by means of a washer 56 which bears on the periphery of the small slot end 46 and by a through bolt 58 which passes through the frame member 28 and is retained by a nut (not shown). Rotation of the pivot stud 26 must be prevented to cause stop bracket 36 to remain fixed in space. Rotation is prevented by a pair of flats 64 formed on a plate 66 which is fixed such as by a rivet, to the frame member 28. The flats 64 on plate 66 are engaged by a complementary pair of flats 68 (FIG. 5) on the inter end of the stud member 26 in order to prevent rotation. The cylindrical intermediate portion 69 of the stud member 26 between the flatted retaining portion 68 and the cylindrical bearing portion 38 is adapted to be received within bushing member 72 which pivotally supports the seat back support legs 70.

The operation of the aforementioned quick release mechanism can be briefly summarized as follows: As indicated by the arrows "A", "B" and "C" in FIG. 1, the seat back 12 is first pushed angularly forward with a force of at least about 35 pounds to its "break-over" position or at least well beyond the normal forward upright seating position shown at the left of FIG. 1, and in FIG. 2. The tray table assembly 16 is unlocked from fastener 20 and is rotated slightly rearwardly of its "break-over" position, shown in FIG. 1, until the legs 22 reach the angle shown in FIG. 4. In this position, the paralled restrictions 50 in the slot 44 are aligned with the paralled flats 40 on stud 26 so the assembly 16 can then be lifted as indicated by arrow "B" to bring the large opening 48 up toward the surface 38 of stud 26. In this position, which is shown in solid lines in FIG. 5, the legs 22 can be deflected toward each other as indicated by arrows "C" in FIG. 1. As the legs are deflected sideways, the large opening 48 therein will clear the washer 56 and bolt 58, as shown in dotted lines at 22' in FIG. 5, causing the table assembly to be free of the seat. To replace a tray table, the preceding steps are simply followed in the reverse order.

Using the aforementioned procedures, it is obvious that the entire process of removing or replacing a table assembly 16 takes only a few seconds and requires no tools. Since the distance between the slot restrictions 50 in the table leg slot 44 is less than the diameter of the cylindrical portion 38 of stud 26, it is obvious that the table assembly cannot be removed from the seat back in any of the normal positions of the seat back 12 between its upright FIG. 2 position and its fully reclined FIG. 3 position. Only when the seat is moved to its "break-over" FIG. 4 position can the table assembly be lifted relative to the stud 26. As previously discussed, the usual passenger does not know of the "break-over" position, and thus cannot remove the tray table.

Figure 8:
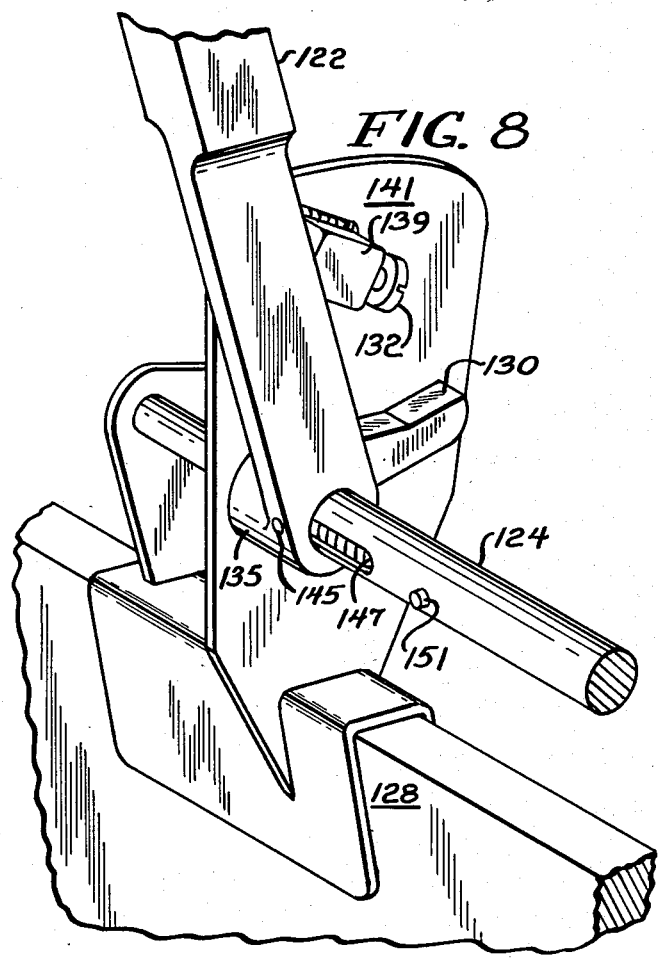
FIG. 8 is an enlarged perspective view of the tray table leg and mounting assembly shown in FIG. 7.
Figure 9:
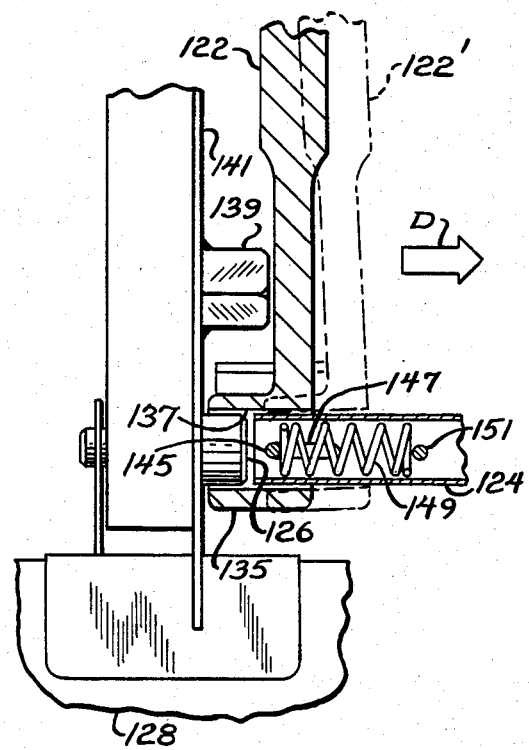
FIG. 9 is a rear view of the tray table leg and mounting assembly of FIGS. 7 and 8 with the table leg shown in dotted lines in the position it assumes when it is deflected to its disassembly position.

The embodiment of the invention shown in FIGS. 7-9 illustrates a modified form of quickly releasable tray table assembly 116 which has a torsion bar 124 positioned at the lower ends of the table legs 122 rather than internally of the table member 118. The reference numbers 110-132 correspond to elements which perform the same function as elements 10-32 in FIGS. 1-6. Although one of the seat backs 112 on the seating unit 110 is shown as being pushed forward to its "break-over" position, the table release assembly can actually be released when the seat back 112 is in its forward upright position shown at the left side of FIG. 7.

The tray table legs 122 have axially aligned elongated portions 135 at their lower ends (FIGS. 8 and 9) which include a hollow cylindrical interior bearing surface 137 which is adapted to engage both the pivot stud 126 and the end portion of the torsion tube 124, as shown in solid lines in FIG. 9. The legs 122 can pivot about pivot stud 126 within a limited range but are retained in a predetermined angular position when the tray table 118 is deployed for use. This latter position is the position at which the stop finger portion 130 which is integral with the elongated portion 135 contacts stop portion 132. The stop portion 132 is shown in FIG. 8 as a screw head which can be adJustably positioned in a block 139 on the vertical metal bracket 141 which is fixedly mounted to the seat frame 128. A pin 145 is mounted to pass completely through the elongated portion 135 and through the elongated slots 147 in the torsion tube 124. The pin and slot connection permits axial movement of the leg portion 135 relative to the tube 124, while preventing relative rotational movement. Thus, the table legs 122 can be moved toward each other in the direction of the arrows "D" in FIGS. 7 and 9 to uncouple the leg portions 135 from the pivot studs 126. The opposite end of the torsion tube 124 is preferably fixed relative to the other leg of the tray table assembly, such as by a pin (not shown) similar to the pin 145. However, no slot 147 would be required since one slot can provide the necessary amount of deflection of the legs. When the legs have been moved to their deflected position 122' shown in FIG. 9, the entire table assembly 116 can be moved away from the seat back 112 as indicated by the arrow "E" in FIG. 7. The legs 122 are normally biased to their engaged position with studs 126 by a compression spring 149 which is compressed between pin 145 on the leg and pin 151 which is mounted in the walls of tube 124.

In order to prevent the tray table assembly 116 from being released by unauthorized persons, such as passengers, the upholstered seat back dress cover 153 is cut and formed so that it covers the torsion tube 124 and the slot 147. Hidden fastening means 155 on the lower and side edges of the dress cover 153 permit the cover to be lifted by authorized persons in order to permit the legs 122 to be deflected from the studs 126.

I claim as my invention:

1. A seat back mounted tray table assembly for a transport vehicle passenger seat which may be quickly assembled not disassembled, without tools, from a mounted relationship with a pair of seat frame members located adjacent the opposed side edges of a seat back member by authorized persons but protected form removal by passengers, said tray table assembly including a tray table and having a pair of spaced, downwardly extending legs pivoted thereto, said legs being joined by a torsion tube but deflectable by authorized persons toward each other at their lower ends; a pair of short, axially aligned pivot studs mounted to said seat frame members, said pair of pivot studs forming a pivot axis for said pair of legs and cooperating with a pivot aperture or opening formed in each of said legs to mount said legs; stop means on said seat frame members for limiting the outward pivotal movement of said legs away from said seat back when said tray table is deployed from its generally vertical storage position in the seat back to a generally horizontal use position; and means mounted to at least one of said seat frame and seat back members for preventing unauthorized disassembly of said legs from said pair of pivot studs.

2. A tray table assembly in accordance with claim 1 wherein said pivot studs are nonrotatably affixed to said frame members and include a generally cylindrical portion adjacent their outer ends which provides a bearing surface for engaging a complementary bearing surface in said pivot aperture or opening when said tray table is moved between its normal storage and use positions, said bearing surface in said pivot aperture being formed at one end of an elongated slot, said elongated slot having a relatively small diameter aperature which defines said complementary bearing surface at one of its ends and a relatively large diameter aperature at the other of its ends, said apertures being connected by a restricted width portion which is defined by opposed parallel wall portions which are separated by a distance which is less than the diameter of said relatively small diameter aperture, said pivot studs having a pair of opposed parallel flats formed thereon which interrupt said generally cylindrical portion, said parallel flats on said pivot studs being spaced from each other by a dimension which is sufficiently large as to allow said studs to be moved through the restricted width slot portions in said legs only when said legs are in a predetermined angular position wherein the parallel wall portions of the slot are parallel to the parallel flats on the studs.

3. A tray table assembly in accordance with claim 2 wherein said pivot studs have an enlarged diameter element at their outer ends which prevents the deflection of said legs towards each other except when said legs and said elongated slots therein have been lifted relative to said studs to cause said pivot studs to become aligned with said relatively large diameter apertures.

4. A tray table assembly in accordance with claim 3 wherein said enlarged diameter element comprises the head of a bolt.

5. A tray table assembly in accordance with claim 2 wherein said predetermined angular position can only be achieved by forcibly moving the seat back to a position substantially forward of its normal forward upright position.

6. A tray table assembly in accordance with claim 2 wherein said stop means on said frame comprises a bracket fixedly attached to each of said pivot studs, said pivot studs being nonrotatably attached to said seat frame members, each of said brackets being engagable by the head of a threaded fastener which is adjustably positioned in a leg of the tray table assembly.

7. A tray table assembly in accordance with claim 1 wherein said torsion tube is positioned inside said tray table.

8. A tray table assembly in accordance with claim 1 wherein said torsion tube is positioned at the lower ends of said legs and in axial alignment with said pair of pivot studs.

9. A tray table assembly in accordance with claim 8 wherein one of said pair of legs has a hollow elongated portion at its lower end which includes an interior cylindrical bearing surface which engages both the torsion tube and one of said pivot studs when the table assembly is in its use position but is slidable axially of said torsion tube and out of engagement with said one of said pivot studs when said legs are deflected toward each other.

10. A tray table assembly in accordance with claim 9 wherein a compression spring inside said torsion tube normally biases said legs away from each other and into engagement with said pivot studs.

11. A tray table assembly in accordance with claim 9 wherein a pin is fixedly mounted in said leg so as to pass completely through said hollow elongated portion of said leg, said pin passing through an axial slot in said torsion tube to permit a limited amount of relative axial movement between said leg and tube while preventing relative rotational movement.

12. A tray table assembly in accordance with claim 11 wherein a dress cover is detachably attached to the back of said seat back so that said torsion bar is covered when said dress cover is attached and uncovered when it is detached.

13. A tray table assembly in accordance with claim 9 wherein said stop means on said seat frame members comprises an adjustable length threaded fastener mounted for movement on a bracket attached to each of the seat frame members, the end of said fastener being engagable by an arm extending radially outwardly of said hollow elongated portion of said leg.

* * * * *

UNITED STATES PATENT AND TRADEMARK OFFICE
CERTIFICATE OF CORRECTION

PATENT NO. : 4,511,178
DATED : April 16, 1985
INVENTOR(S) : Edward J. Brennan

It is certified that error appears in the above-identified patent and that said Letters Patent are hereby corrected as shown below:

Column 5, line 68, "not" should read --and--

Signed and Sealed this

Thirtieth Day of July 1985

[SEAL]

Attest:

DONALD J. QUIGG

Attesting Officer     Acting Commissioner of Patents and Trademarks